United States Patent [19]
Anderson et al.

[11] Patent Number: 5,871,114
[45] Date of Patent: *Feb. 16, 1999

[54] METHOD FOR RECYCLING HOUSEHOLD WASTE

[75] Inventors: Dennis C. Anderson, Northfield; Brett A. Anderson, Prior Lake; Harold T. Hjermstad, II, Eden Prairie, all of Minn.

[73] Assignee: National Polymers Inc., Lakeville, Minn.

[ * ] Notice: The term of this patent shall not extend beyond the expiration date of Pat. No. 5,390,813.

[21] Appl. No.: 339,558

[22] Filed: Nov. 15, 1994

Related U.S. Application Data

[63] Continuation of Ser. No. 128,989, Sep. 29, 1993, Pat. No. 5,390,813.

[51] Int. Cl.⁶ .................................................. B65D 25/00
[52] U.S. Cl. ............................................................. 220/404
[58] Field of Search ................................... 220/404, 555, 220/909

[56] References Cited

U.S. PATENT DOCUMENTS

| | | | |
|---|---|---|---|
| 5,086,917 | 2/1992 | Dziersk et al. | 220/555 X |
| 5,088,750 | 2/1992 | Beese et al. | 280/47.26 |
| 5,390,813 | 2/1995 | Anderson et al. | 220/404 |

Primary Examiner—Steven M. Pollard
Attorney, Agent, or Firm—James V. Harmon

[57] ABSTRACT

The invention provides a new method of recycling recyclable waste products suited for household use wherein the container is a plastic injection-molded container having a monolithic body formed from plastic resin and includes a pair of integral compartments. Fibrous waste is placed in one compartment and nonfibrous waste comprising rigid and semirigid container, e.g., glass jars, metal beverage and food cans, plastic bottles and glass bottles are placed in the other compartment so as to presort the recyclable articles. The container is then taken to a collection point where the presorted products can be picked up by a recycling collection contractor and maintained separate from one another during transport to a recycling center.

7 Claims, 4 Drawing Sheets

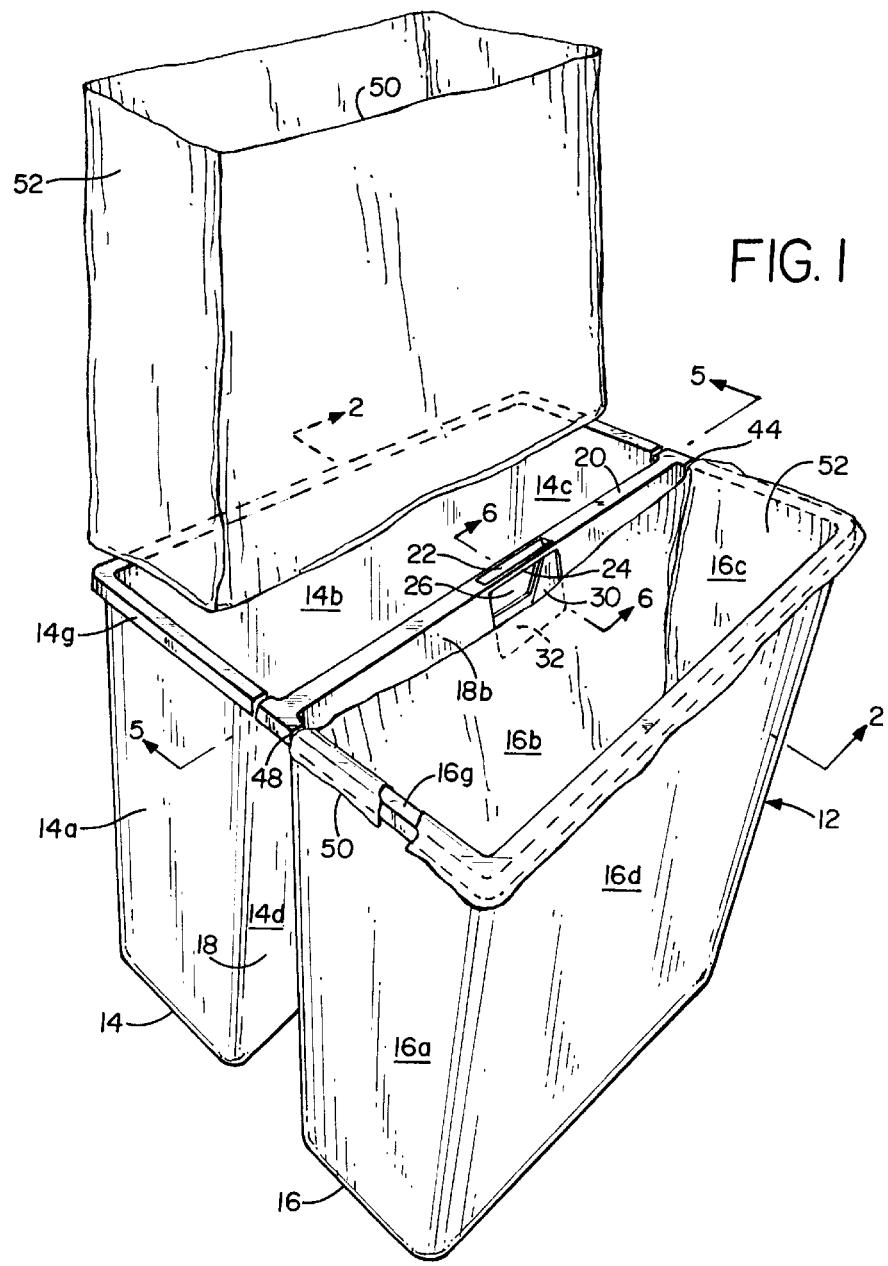
FIG. 1
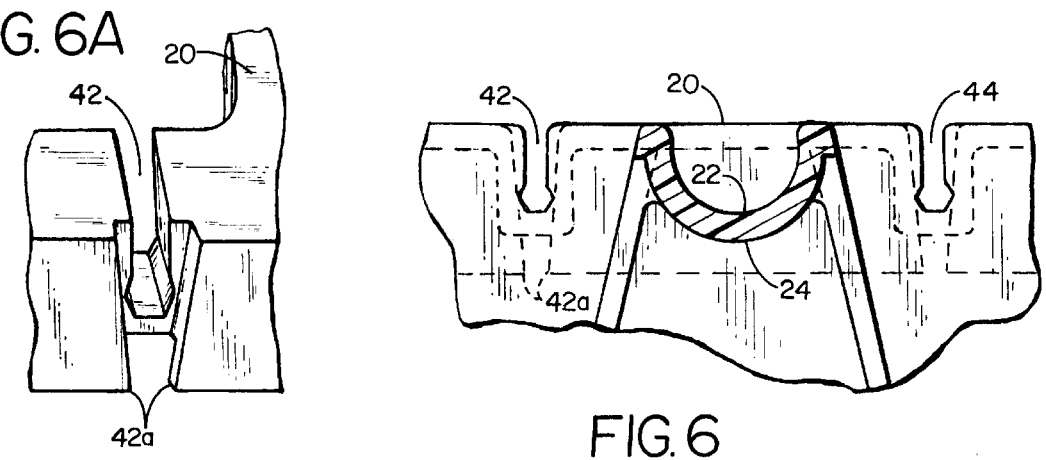
FIG. 6A
FIG. 6

METHOD FOR RECYCLING HOUSEHOLD WASTE

This application is a continuation of Ser. No. 128,989 filed Sep. 29, 1993 now U.S. Pat. No. 5,390,813.

FIELD OF THE INVENTION

This invention relates to containers for recyclable materials and more particularly to a multi-compartmented recycling container and method.

BACKGROUND OF THE INVENTION

The practice of recycling household waste has recently been adopted throughout the United States and in many foreign countries. This revolution in the handling of waste has resulted in the need for a recycling container that is easy to carry, is stackable, i.e., is constructed in such a way that several of the containers can be nested one inside the other and more specifically, has a carrying handle that will not interfere with good stacking characteristics.

The garbage and recycling industry has made a commitment to provide a co-mingled recycling recovery program in which mixed recyclables are collected. As a result, hundreds of material recovery facilities are now operating or are under construction. In these programs, recyclable waste is collected at the point of generation and is then delivered to a recovery facility where material is separated, processed and end marketed.

In view of the deficiencies of the prior art, one object of the invention is to provide a new method and container for separating, depositing and collecting recyclable materials both in the home and in commercial locations.

Another object is to minimize the labor required in handling and carrying recyclable materials that are deposited in the container.

Another object is to maximize saving of space by providing a recycling container that can be placed very close to the point where recyclable materials are generated, namely the kitchen, more specifically in a cabinet beneath the kitchen sink.

It is another object of the present invention to provide a recycling container suited for co-mingled recycling by assisting in the separation of recyclable materials into two categories at home so that it can be used as an in-house recovery container as well as for commercial use.

It has been found that a container for sorting recyclable materials is most effectively stored in a cabinet under the kitchen sink. To be successful we found that the container should have a carrying handle that does not extend above the top edge of the container. It was found, for example, in our preliminary evaluation that a handle which extended even a few inches above the top edge of the container would be likely to strike obstructions such as pipes in the cabinet. Accordingly, it is another object of the invention to find a way of providing a recycling container with a handle that is recessed and even though located at an elevation no higher than the upper edge of the container will not interfere with the ease of carrying the container or stacking of the containers one inside another.

A more specific object of the invention is to provide a comfortable handle which will enable the container to be easily carried with one arm and yet will allow the container to be placed in a cabinet under the kitchen sink because it has no projecting portions that, if present, could strike plumbing or other objects in the cabinet while at the same time maximizing the nesting capabilities of the container.

Another object of the invention is to provide a recycling container having a pair of side-by-side upwardly opening compartments with a wide mouth at the top of each compartment and to find a way of connecting and supporting the upper edge of a flexible plastic liner from the mouth of each of the compartments.

A more specific object is to enable the open top of a plastic film liner bag to be turned downwardly over the edge of each compartment with a provision for reliably holding the upper edge of the liner bag in place at the top edge of the compartment so that when recyclable materials are placed in the bag, the bag itself will not accidentally slide or be pushed into the container.

These and other more detailed and specific objects of the present invention will be better understood by reference to the following figures and detailed description which illustrate by way of example but a few of the various forms of the invention within the scope of the appended claims.

SUMMARY OF THE INVENTION

The invention provides a recycling container formed from plastic resin and including a pair of side-by-side upwardly opening integral compartments having a hollow partition between them. Each of the compartments has a plurality of upright side walls and an upwardly opening wide mouth, each with a horizontal rim located in the same plane. The upper edge of two adjacent side walls, i.e., the rims that make up the sides of the partition are joined together by a horizontally disposed connecting panel that is located in the plane of the rim of each compartment for defining the upper margin of the space in the hollow partition between the compartments. The center portion of this connecting panel comprises a handle for enabling the container to be carried. Beneath this handle is an opening through the partition to facilitate entry of the hand. In a preferred form of the invention, the handle is convexly curved as seen from below to provide a comfortable grip. The upper open mouth of each compartment is also provided with an optional outwardly and downwardly extending recurved lip and an optional pair of retaining slots to support the edge of a liner, if present, formed from plastic film to help keep the container clean during use. When such retaining slots are provided, they open upwardly at the top edge of each compartment and two such slots are located adjacent to each end of the connecting panel.

Also in accordance with the present invention, a new method is provided for recycling recyclable waste products. In accordance with the present method, a recycling container having a pair of side-by-side compartments each with an upwardly opening wide mouth is provided. The container serves as a means to facilitate presorting the recyclable materials into two product categories and thus enables a user, e.g., a householder, to carry out the first stage of separation that is to be completed by the recycler. In the first compartment is placed recyclable fiber products including paper commodities, newsprint, magazines, paper bags, mail, phone books, etc. In the other compartment is placed rigid and semirigid recyclable containers including glass jars, metal beverage and food cans, as well as plastic and glass bottles. The recycling container is then taken to a pickup point. Typically it is placed in front of the home near the street. The recycling contractor then removes the presorted recyclables from the compartments and maintains them separate from one another. Further separation of recyclable materials as required is carried out by the recycling contractor.

THE FIGURES

FIG. 1 is a perspective view of the invention as it appears with an optional liner placed in one compartment thereof;

FIG. 6 is a greatly enlarged partial vertical sectional view taken on line 6—6 of FIG. 1; and FIG. 6A is a partial perspective view of one of the retaining slots as seen from the outside of the container.

DETAILED DESCRIPTION OF THE INVENTION

Figure 2:
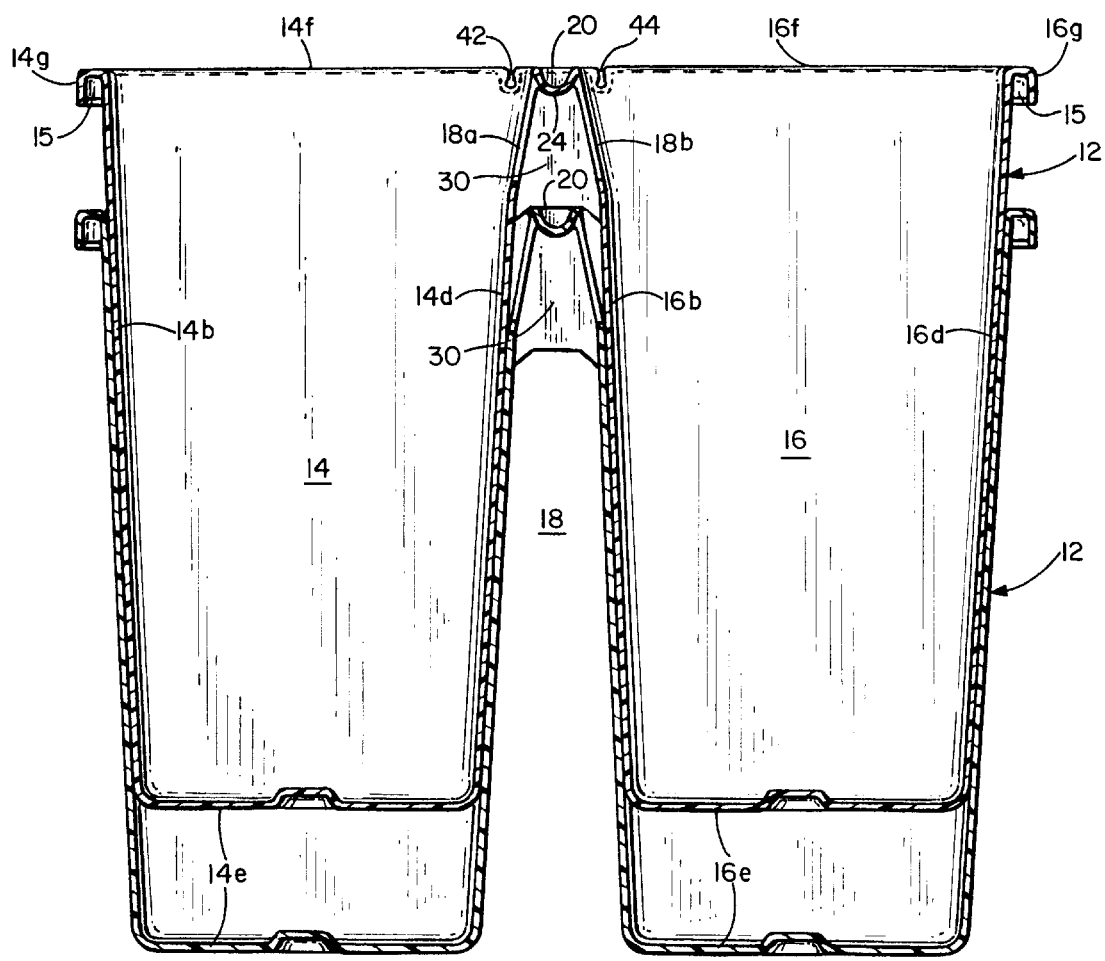
FIG. 2 is a transverse vertical sectional view taken on line 2—2 of FIG. 1 also showing the stacking of two of the containers.
Figure 3:
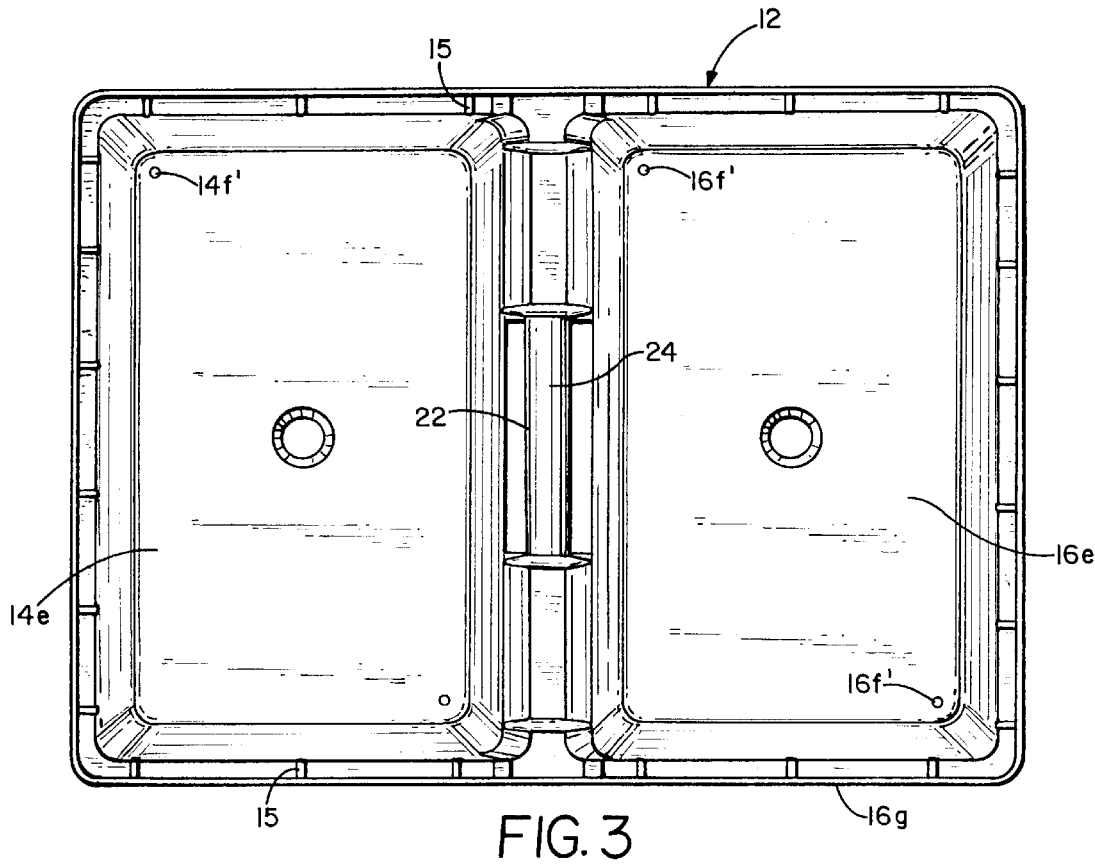
FIG. 3 is a bottom view of the container.
Figure 4:
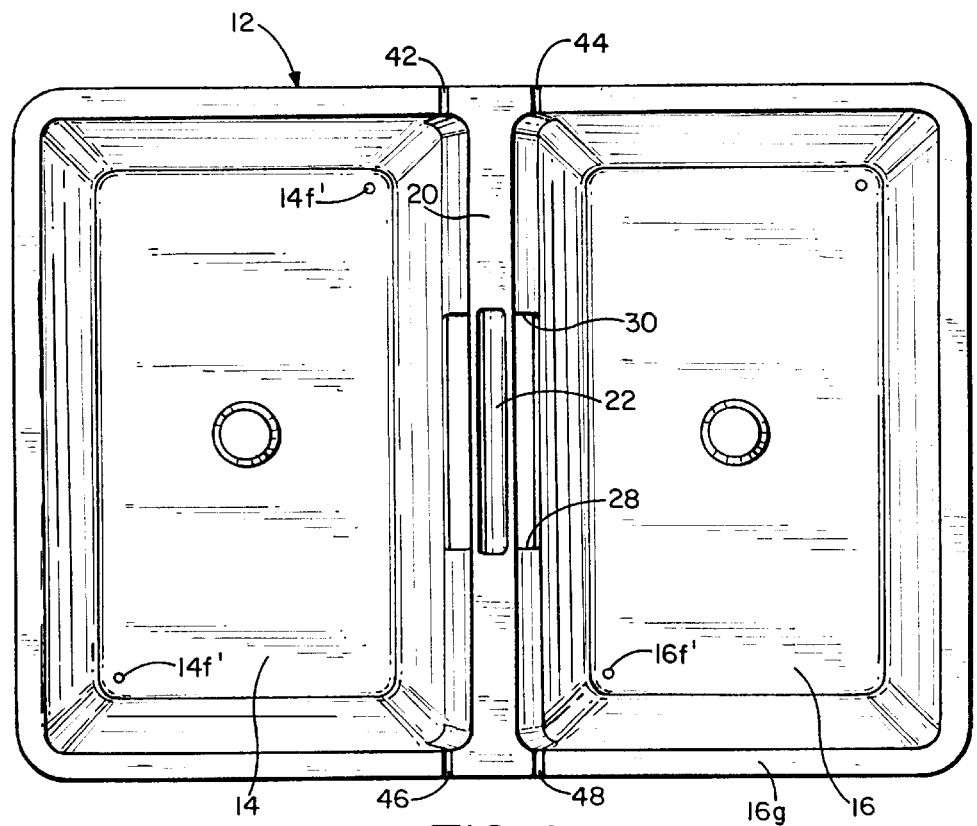
FIG. 4 is a top view of the container.

Refer now to the figures in which is illustrated a recycling container for sorting waste products such as paper bags, newspapers, cans, bottles and the like. The container indicated generally at 12 has two side-by-side compartments 14 and 16 separated by a hollow partition 18. Container 12 is preferably a monolithic body formed from plastic resin in which the compartments 14 and 16 are integral with one another. The compartment 14 includes four upright side walls 14a, 14b, 14c and 14d and a bottom wall 14e. The compartment 16 has four upright side walls 16a, 16b, 16c and 16d and a bottom wall 16e. Each of the compartments 14 and 16 has an upper open wide mouth surrounded by a rim (14f and 16f). The bottom walls 14e and 16e can have drain holes 14f' and 16f'.

The side walls of each compartment 14, 16 preferably converge toward one another proceeding in the direction of the bottom of the container to facilitate stacking as shown in the figures. Two of the side walls 14d, 16b are spaced apart from one another to define the sides of the hollow partition 18. Near the top of the partition 18 the walls 14d, 16d converge proceeding upwardly at 18a, 18b (FIG. 2) and are joined to one another at their upper edges by means of a horizontally disposed, laterally extending integral connecting panel 20 located at the same elevation as the upper edge of the mouths surrounded by the rims 14f, 16f of the respective compartments 14 and 16. The rims 14f, 16f of the compartments 14 and 16 are each preferably surrounded by outwardly extending downwardly recurved lips 14g and 16g, respectively. The lips can be strengthened with reinforcing webs 15. The lips 14g, 16g strengthen the container 12 and also provide a hand grip to assist in carrying the container.

At the center of the connecting panel 20 is a horizontally disposed laterally extending handle 22 having the shape of a half-cylinder, i.e., the handle 22 is hemi-cylindrical so as to have a downwardly extending convexly curved lower surface 24 for providing a comfortable grip. The upper surface of the handle 22 is trough-shaped, i.e., the handle 22 has an upwardly opening recess and a downwardly, convexly curved lower surface. Below the handle 22 is a transversely extending rectangular opening 26 in each of the converging portions 18a, 18b of the walls 14d, 16b. The opening 26 is provided with upright side walls 28, 30 (FIG. 5) but has no bottom wall at 32. As a result of this construction the handle 22 provides a very comfortable grip and is located at or slightly below the rims 14f, 16f of compartments 14, 16. The rims 14f and 16f of the compartments 14, 16 and the connecting panel 20 form a uniplanar top surface for the container 12 which includes the handle 22. By the term uniplanar is meant, lying in the same plane.

One can easily place one's hand through the opening 26 beneath the handle but at the same time the handle is substantially the same elevation as the top edge of each of the compartments 14 and 16. It should be noted that the handle 22 does not project above the upper edges of compartments 14, 16 or lips 14g, 16g. In addition, the handle 22 does not interfere with nesting of the containers. Thus, two or more of the containers 12 can be placed easily one inside of another as shown in FIG. 2. This gives the container 12 of the present invention excellent stacking characteristics so as to facilitate shipment and storage.

Figure 5:
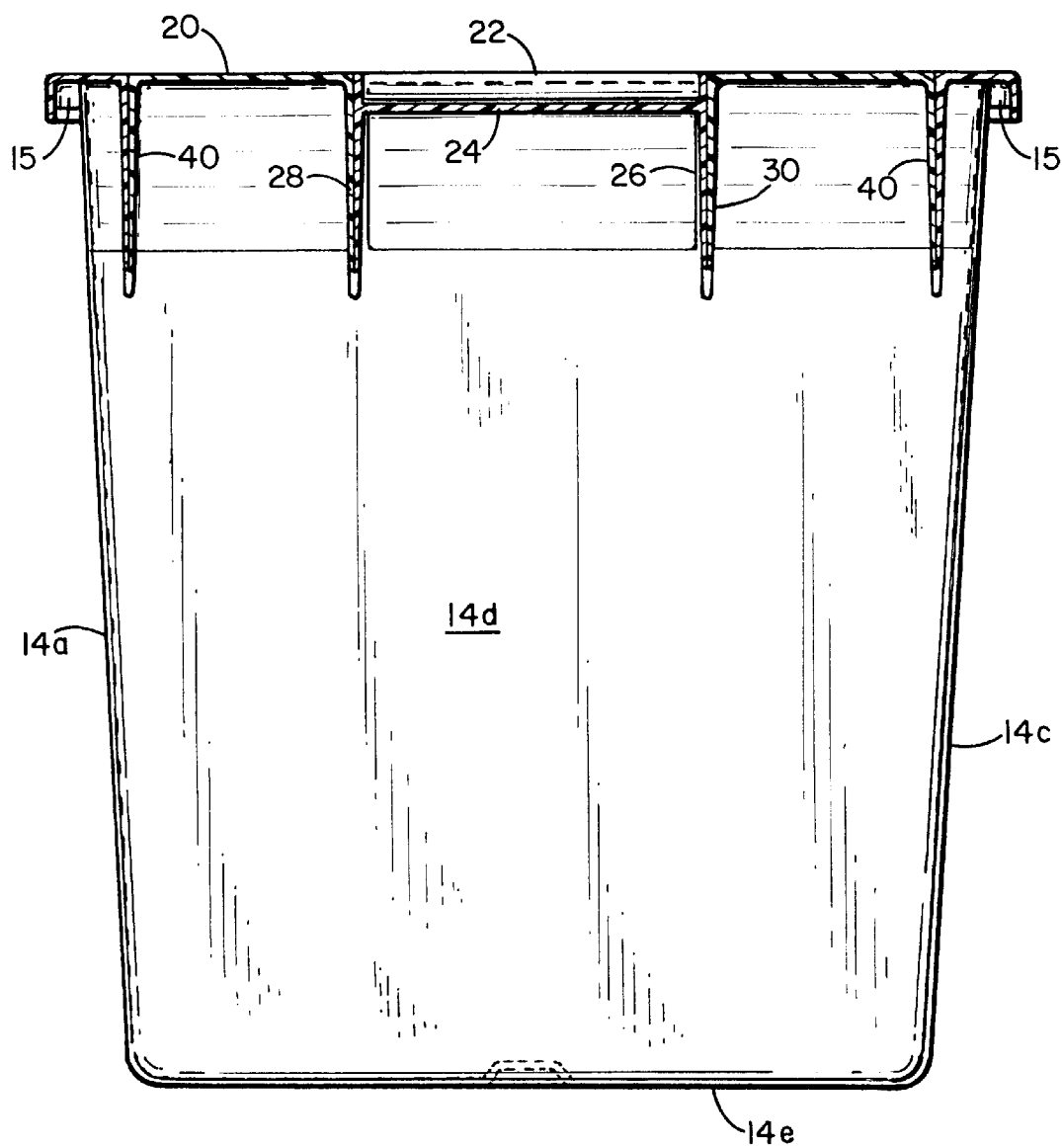
FIG. 5 is a transverse vertical sectional view taken on line 5—5 of FIG. 1.

Upright reinforcing webs 40 are preferably provided spaced apart at locations beneath the connecting panel 20 to furnish added strength. As shown in FIG. 5 the reinforcing webs 40 extend downwardly to approximately the lower edges of the tapered side walls 18a, 18b.

Located adjacent either end of the connecting panel 20 in the lips 14g, 16g of the respective compartments are provided, if desired, optional downwardly extending upwardly opening bag retaining slots 42, 44, 46 and 48 for receiving the upper edge 50 of an optional liner bag such as a flexible plastic film liner bag 52 which is commercially available in various sizes for lining wastebaskets and the like. In the lip portions 14g, 16g of the container 12 are provided upright openings which are aligned with the slots 42–48. The edges of these openings converge proceeding downwardly to provide sharp corners 42a (FIGS. 6 and 6A) which act as hooks for securely holding the top 50 of a liner bag 52 in place. If the liner bag 52 is to be used, the bag is inserted into one or both of the compartments 14, 16 and the edge portion 50 of the top of the bag 52 adjacent to the partition 18 is turned downwardly into one of the slots 42–46 and its edge is stretched under one of the hooks 42a on either side of the container 12. The hooks 42a securely and reliably hold the bag 52 in place. The other edge of the bag 52 is stretched over the lip 14g, 16g as shown at the right in FIG. 1 to provide a tight fit and secure support for the upper edge 50 of the liner bag 52. The top edge 50 of bag 52 can be hooked into the slots on the same or opposite side of the panel 20 from the compartment in which the bag 52 is placed. By hooking the edge of the bag 52 in a slot on the opposite side of the panel 20, the bag 52 is stretched further and thus can be hooked more securely. This will keep the bag 52 from sliding down even if articles are thrown into it.

The invention provides an excellent container to assist in the sorting of recyclable materials. It is particularly valuable in making possible at least partially presorting articles into two groups at the source. For example, the compartment 14 can be lined with a paper bag and be used for fiber (paper commodities, newsprint, magazines, mail, phone books, etc.) while the compartment 16 can be lined with a flexible plastic waste bag, i.e., a wastebasket liner bag and then used for glass jars, metal beverage and food cans, plastic and glass bottles. Either or both compartments can be provided if desired with a liner bag 52.

In accordance with the present invention, a new method is provided for recycling recyclable waste products. In accordance with the present method, a recycling container 12 having a pair of side-by-side compartments 14, 16, each with an upwardly opening wide mouth is provided. The container 12 serves as a means to facilitate presorting the recyclable materials into two product categories and thus makes it possible for a householder to carry out in the home the first stage of separation that is to be completed by the recycler. Typically, in the first compartment 14 the user places recyclable fiber products including paper commodities, newsprint, magazines, paper bags, mail, phone books, etc. In the other compartment 16 the user places rigid and semirigid recyclable containers including glass jars, metal beverage and food cans, as well as plastic and glass bottles. The recycling container 12 is then taken to a pickup point, usually in front of the home near the street. The recycling contractor then removes the presorted recyclables from the compartments 14, 16, while maintaining them separate from one another. Further separation of recyclable materials as required can be carried out by the recycling contractor.

The container 12 is excellent for use both in the home and in commercial installations. In the home it can easily be slid into a compartment under the sink, at the point where most waste originates. It will be seen that since the handle 22 is at the same level as the top of the rims 14ƒ and 16ƒ of the compartments and extends slightly below that level, it will not project above the top of the compartments 14 and 16 and consequently will not catch on obstructions when the container is being placed in or removed from storage. The slots 42–46 in the top rim of the compartments 14, 16 are highly effective in efficiently holding the tops of the liner bags 52 in place, especially if the user should decide to store non-recyclable waste or for some other reason want to line one or both of the compartments 14, 16.

While most currently available containers are difficult to carry, the container 12 of the present invention can be easily lifted and carried with one arm which makes more efficient use of the back muscles and thus reduces labor involved in carrying the recycling container 12 to the street.

The handle 22 is constructed and designed to provide a comfortable grip for the hand but yet does not interfere with efficient nesting of the containers one inside another as shown in FIG. 2.

Many variations of the present invention within the scope of the appended claims will be apparent to those skilled in the art once the principles described herein are understood.

What is claimed is:

1. A method suited for household use for recycling and presorting recyclable waste materials comprising, molding a recycling container as a monolithic plastic resin container body including a pair of integral side-by-side upwardly opening stackable compartments each having side and bottom walls and an upwardly opening wide mouth and being of a size adapted to fit in an undersink compartment within a kitchen of a home or for use in a commercial location, providing said container with a hollow downwardly opening upright partition between the compartments, forming the partition from a pair of adjacent side walls that converge toward one another proceeding upwardly and terminate proximate to an upper end of each compartment, forming a handle in an upper portion of the partition and providing a hand opening in the partition beneath the handle, placing a plurality of said containers inside one another in a stacked condition to facilitate shipment and storage of the containers while nested together, placing the handle of each such nested container proximate to the hand opening of each similar container thereabove, transporting the containers for use or sale in a stacked condition, placing one of the containers at a location where recyclable waste originates, placing a first category of recyclable waste materials in one of said compartments at the location where the recyclable waste originates, placing a second category of recyclable waste materials in the other of said compartments at the location where said waste material originates, grasping the handle manually and using the handle for carrying the recycling container to a pickup point, whereby a waste recycling collector receives presorted waste materials and is able to maintain the first and second categories of presorted waste materials separate from one another during further handling and transport to a recycling center.

2. The method of claim 1 including, placing a removable liner in at least one of said compartments before the recyclable waste materials are placed therein.

3. The method of claim 2 including, providing a retaining slot in an upper rim of the container and placing a top portion of the liner into the retaining slot before the container is used to receive recyclable waste materials.

4. The method of claim 1 including, placing a paper bag in the compartment used for receiving said first category which comprises fibrous recyclable waste materials and placing a flexible plastic bag in the other of said compartments for receiving the second category which comprises recyclable rigid and semi-rigid containers comprising glass jars, metal beverage and food cans, plastic bottles, and glass bottles.

5. A method suited for household use for recycling and presorting recyclable waste materials comprising, molding a recycling container as a monolithic body of plastic resin including a pair of integral side-by-side upwardly opening compartments each having side and bottom walls and an upwardly opening wide mouth and being adapted to receive and store said materials, forming a partition as a part of the container during the molding of the container with the partition located between the compartments with side walls of the compartments defining the partition and the compartments having side walls that converge toward one another proceeding downwardly toward a bottom portion of the compartments, said partition terminating in an upper portion located proximate to an upper end of each compartment, forming a handle in said upper portion of the partition and providing a hand opening in the partition beneath the handle, placing a plurality of said containers inside one another in a stacked condition to facilitate shipment and storage of the containers while nested together, placing the handle of each such nested container proximate to the hand opening of each similar container thereabove, transporting the containers for use or sale in a stacked condition, placing one of the containers at a location where recyclable waste originates, placing removable liner bags in the compartments of the container, placing a first category of recyclable waste materials in one of said compartments proximate to the location where the recyclable waste originates, placing a second category of recyclable waste materials in the other of said compartments proximate to the location where said waste material originates, grasping the handle manually and using the handle for carrying the recycling container to a pickup point, whereby a waste recycling collector receives presorted waste materials and is able to maintain the first and second categories of presorted waste materials separate from one another during further handling and transport to a recycling center.

6. The method of claim 5 including, providing a retaining slot along an upper edge thereof and placing a top portion of the liner bag into the retaining slot before the container is used to recycle waste material.

7. The method of claim 5 wherein the liner bag is a paper bag, placing the paper bag in one of the compartments for receiving a first category of waste material comprising fibrous recyclable material and placing a flexible plastic liner bag in the other of said compartments for receiving a second category of waste which comprises recyclable rigid and semi-rigid containers including any of the following: glass jars, metal beverage and food cans, plastic bottles, and glass bottles.

* * * * *